(No Model.)

C. F. UEBELACKER.
JOURNAL BEARING.

No. 600,938.          Patented Mar. 22, 1898.

Attest:
L. Lee
Edw. F. Kinsey.

Inventor.
C. F. Uebelacker,
per Thomas S. Crane, Atty.

UNITED STATES PATENT OFFICE.

CHARLES F. UEBELACKER, OF NEWARK, NEW JERSEY.

JOURNAL-BEARING.

SPECIFICATION forming part of Letters Patent No. 600,938, dated March 22, 1898.

Application filed February 12, 1897. Serial No. 623,045. (No model.)

*To all whom it may concern:*

Be it known that I, CHARLES F. UEBELACKER, a citizen of the United States, residing at Newark, county of Essex, State of New Jersey, have invented certain new and useful Improvements in Journal-Bearings, fully described and represented in the following specification and the accompanying drawings, forming a part of the same.

The invention relates particularly to that class of babbitted journal-bearings which are used for supporting the journals of car and motor axles upon street-railway cars and which are exposed to a great deal of dust that is liable to penetrate the bearing and injure the journal if the end of the bearing be left open.

The invention may be applied to babbitted bearings under any conditions where the end of the bearing requires to be closed.

In the present invention the penetration of dust into the end of the babbitted bearing is prevented by means of a metallic disk or cap locked in the outer end of the journal by a collar formed upon the babbitt lining and bent over the edge of the disk. The journal-box itself is in practice formed of brass or cast-iron, and the babbitt lining is applied within the same to form a suitable wearing-surface for the journal; and the invention therefore consists of a journal-box comprising a shell of comparatively hard metal, a lining of Babbitt metal having an integral collar at the outer end thereof, a cap fitted within the collar portion of the lining, and the lining bent or clenched over the collar to hold the same in place. To hold the disk in place during the clenching or riveting operation, the babbitt lining may be provided internally with an annular shoulder near the end arranged to support the disk, with its exterior at the end of the shell, so that the projecting collar may be bent over the edge of the disk, and thus hold the same even with the outer end of the shell. Heretofore it has been common to make a cap at the end of such a bearing by punching a steel or iron disk from a sheet of suitable thickness and forcing the same within the bore of the babbitt lining at one end; but in the case of car-axle journals the vibrations to which the journals are subjected when in use upon a street-car is so great that such a disk is frequently jarred loose and lost from the bearing, thus exposing the journal to the intrusion of dirt and grit.

Figure 1:
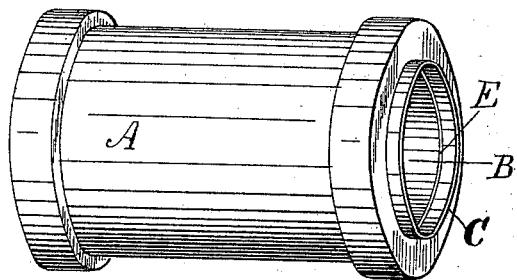
Figure 2:
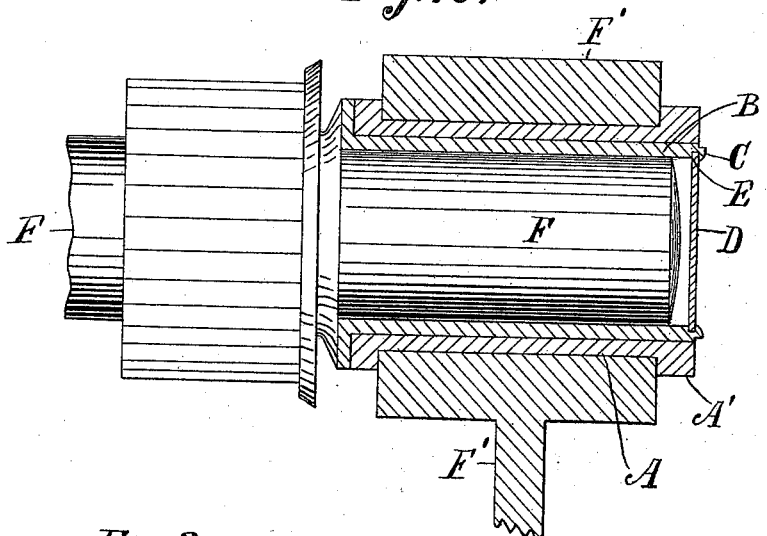
Figure 3:
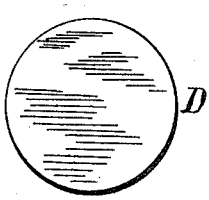

In the annexed drawings, Figure 1 is a perspective view of a cylindrical journal-bearing having the projecting collar upon the babbitt lining. Fig. 2 is a section of the bearing and the frame supporting the same with the axle and cap in their operative relation, and Fig. 3 is an end view of the disk-like cap.

A designates the shell of the bearing, B the babbitt lining, and C the babbitt collar, projecting from one end of the lining beyond the end of the shell.

D designates the disk, formed of thin sheet metal by punching and having, therefore, a cylindrical edge at right angles to the flat surfaces.

The babbitt lining is shown formed with a shoulder E a sufficient distance from one end of the shell to hold the cap D with its outer side flush with the end of the shell, as seen in Fig. 2. The collar C is shown in Fig. 2 mashed or clenched down over the edge of the disk, thus locking the same securely in place and preventing it from jarring loose.

F designates a motor armature-axle fitted within the bearing in Fig. 5 and wholly protected from dust at the outer end by the cap D. The bearing is shown supported in frame F', with the journal-box projecting through the frame and retained therein by flanges A'.

The projecting collar C may be cast upon the babbitt lining by any suitable means, as by a mold adapted to hold the ends of the bearing concentric with the mandrel and having an annular recess adjacent to the end of the bearing to form the projecting collar C.

The disk-like form of the cap D is shown in Fig. 3, and as it is in practice made of harder metal than the babbitt lining B, it is obvious that the violent jarring of the cap when the bearing is in use tends to crush the lining at the margin of the cap, and to thus loosen the cap if not secured in its place by my invention. The injury to a journal from dust and grit may be very great if the cap be lost but a few hours before its loss is discovered, and my invention furnishes a means, without any material expense, of positively preventing the loss of the cap and the consequent injury to the journal.

With a suitable mold no expense is incurred in casting the projecting collar C upon the end of the babbitt lining, and as the bending and riveting of the collar C over the cap effectually secures it in place a nominal amount of labor thus serves to attain all the objects of the invention.

To practice the invention, it is desirable that the babbitt collar C should extend beyond the end of the shell, so that it may be accessible to hammer or press down upon the outer flat side of the disk D.

Having thus set forth the nature of my invention, what is claimed herein is—

A journal-box comprising a shell of relatively hard metal, a lining of Babbitt metal having an integral collar at the outer end thereof, a cap fitted within the collar portion of the lining, and the collar bent or clenched over the cap to hold the same in place, substantially as herein set forth.

In testimony whereof I have hereunto set my hand in the presence of two subscribing witnesses.

CHARLES F. UEBELACKER.

Witnesses:
H. B. TAYLOR,
THOMAS S. CRANE.